United States Patent
Kim et al.

(10) Patent No.: US 7,272,401 B2
(45) Date of Patent: Sep. 18, 2007

(54) APPARATUS AND METHOD FOR DETERMINING POSITION INFORMATION OF USER EQUIPMENT

(75) Inventors: Wuk Kim, Namyangju-si (KR); Joon-Goo Park, Yongin-si (KR); Jae-Woon Park, Yongin-si (KR); Sang-Kyung Sung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 126 days.

(21) Appl. No.: 11/026,414

(22) Filed: Dec. 30, 2004

(65) Prior Publication Data

US 2005/0192027 A1 Sep. 1, 2005

(30) Foreign Application Priority Data

Feb. 17, 2004 (KR) ...................... 10-2004-0010282

(51) Int. Cl.
   *H04Q 7/20* (2006.01)
(52) U.S. Cl. ................. 455/456.1; 455/456.2; 455/456.3; 455/456.4; 455/456.5; 455/456.6; 455/404.1; 455/404.2; 342/357.06; 342/357.08; 342/357.09; 342/357.1; 342/357.15; 342/357.16; 709/213; 709/214; 709/215
(58) Field of Classification Search ............. 455/456.1, 455/456.2, 456.3, 456.4, 456.5, 456.6, 404.1, 455/404.2, 422.1, 414.1; 701/214, 215, 213; 342/357.1, 357.15, 357.16, 357.17, 357.06, 342/357.07, 357.08, 357.09; 709/206
See application file for complete search history.

(56) References Cited

U.S. PATENT DOCUMENTS

| 6,219,557 | B1 * | 4/2001 | Havinis ................... 455/456.4 |
| 6,313,787 | B1 * | 11/2001 | King et al. ............ 342/357.03 |
| 6,429,811 | B1 * | 8/2002 | Zhao et al. ............ 342/357.09 |
| 6,625,458 | B2 * | 9/2003 | Pihl et al. ................ 455/456.1 |
| 6,701,153 | B1 * | 3/2004 | Chang et al. ............ 455/456.1 |
| 6,903,683 | B1 * | 6/2005 | Nicholson ............... 342/357.09 |
| 6,980,813 | B2 * | 12/2005 | Mohi et al. .............. 455/456.1 |
| 6,993,345 | B2 * | 1/2006 | Ogino et al. ............. 455/456.1 |
| 2002/0077116 | A1 * | 6/2002 | Havinis et al. ............. 455/456 |

(Continued)

*Primary Examiner*—Joseph Feild
*Assistant Examiner*—Olumide Ajibade-Akonai
(74) *Attorney, Agent, or Firm*—The Farrell Law Firm (57) ABSTRACT

An apparatus for determining position information of one or more UEs (User Equipments), which includes a plurality of Node Bs for transmitting propagation signals to UEs positioned in a specific cell, and generating predetermined data for measuring position information of the UEs on the basis of propagation signals received from the UEs; a GPS (Global Positioning System) auxiliary information manager for generating and storing GPS auxiliary information associated with a specific cell using a GPS satellite signal received via a built-in GPS receiver; and a RNC (Radio Network Controller) connected to the plurality of Node Bs, for receiving GPS auxiliary information from the GPS auxiliary information manager in response to a request signal of at least one Node B from among the plurality of Node Bs, optimizing the received GPS auxiliary information for every Node B, selecting the optimized GPS auxiliary information, and periodically transmitting the selected GPS auxiliary information to the UEs using a multicast method, in which the Node Bs broadcast the GPS auxiliary information received from the RNC to the UEs positioned in a corresponding cell over a broadcast channel. The apparatus uses a multicast method to differently transmit individual GPS auxiliary information needed for different cells, so that transmission efficiency increases and UEs can more quickly determine their positions.

12 Claims, 4 Drawing Sheets

U.S. PATENT DOCUMENTS

2004/0203876 A1* 10/2004 Drawert et al. .......... 455/456.1
2005/0085257 A1* 4/2005 Laird et al. .............. 455/550.1
2005/0130673 A1* 6/2005 Annamalai ............... 455/456.2

* cited by examiner

APPARATUS AND METHOD FOR DETERMINING POSITION INFORMATION OF USER EQUIPMENT

PRIORITY

This application claims priority to an application entitled "APPARATUS AND METHOD FOR DETERMINING POSITION INFORMATION OF USER EQUIPMENT", filed in the Korean Intellectual Property Office on Feb. 17, 2004 and assigned Serial No. 2004-10282, the contents of which are hereby incorporated by reference.

BACKGROUND OF THE INVENTION

1. Field of the Invention

The present invention relates to an apparatus and method for determining position information of a UE (User Equipment), and more particularly to an apparatus and method for transmitting GPS (Global Positioning System) auxiliary information over a broadcast channel needed to determine position information of the UE, selecting optimum GPS auxiliary information for every Node B, and transmitting the optimum GPS auxiliary information to individual Node Bs.

2. Description of the Related Art

There are a variety of methods for determining position information of a UE in a mobile communication network, and the following three position determinating methods have been developed and are described below as representative examples.

The first position determinating method determines position information of a UE (User Equipment) in cell units upon receiving information of a cell closest to the UE's position or information of the another cell managing the UE.

The second position determination method in a mobile communication network calculates either intensity information of a signal communicated between a Node B and a UE, a Time of Arrival (TOA) of the signal between the Node B and the UE, or a Time Difference of Arrival (TDOA) of the signal between a plurality of Node Bs and the UE, and triangulates the TOA or the TDOA in order to determine the position information of the UE.

The third position determination method determines position information of the UE using the Global Positioning System (GPS) developed by the US Department of Defense.

This method complements GPS techniques, and applies the complemented GPS techniques to a mobile communication network. This method is known as a Network Assisted GPS (NA-GPS) scheme. The NA-GPS scheme transmits GPS auxiliary information needed to determine the UE's position to the UE over a network (e.g., a mobile communication network), such that it shortens an initial position determination time of the UE.

Figure 1:
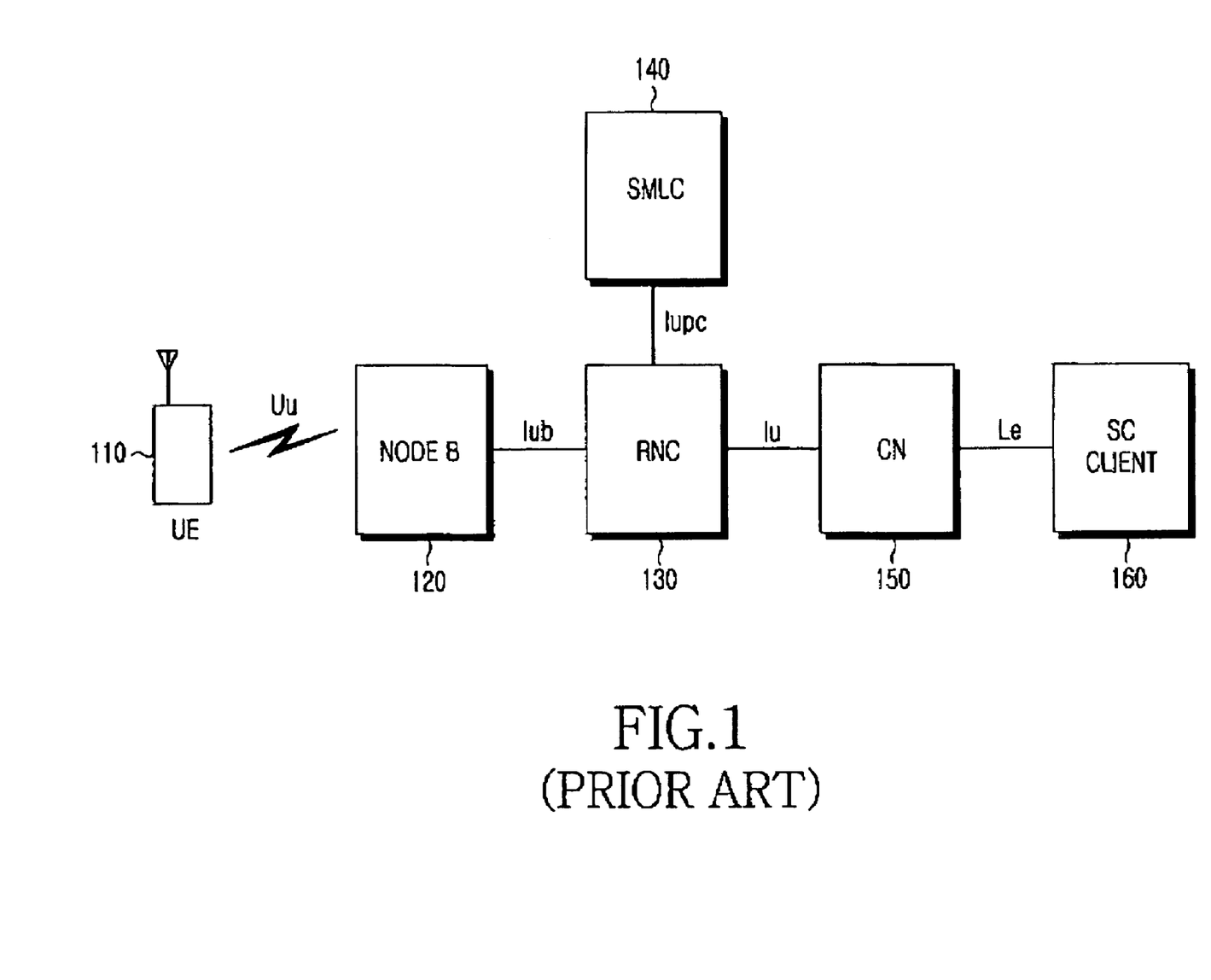
FIG. 1 is a block diagram illustrating a conventional apparatus for determining UE position information.

FIG. 1 is a block diagram illustrating a conventional apparatus for determining position information of the UE. More specifically, FIG. 1 is a block diagram illustrating a position determinating device using the NA-GPS scheme. Referring to FIG. 1, the conventional position determinating device for the UE includes a UE (User Equipment) 110, a Node B 120, an RNC (Radio Network Controller) 130, an SMLC (Serving Mobile Location Center) 140, a Core Network (CN) 150, and a LSC (Location Service Client) client 160.

The Node B 120 transmits a propagation signal to the UE 110 positioned in a specific cell, measures a propagation signal received from the UE 110, and transmits predetermined data (e.g., TDOA, etc.) for determining position information of the UE 110 to the RNC 130. In this case, a 'Uu' interface is adapted between the Node B 120 and the UE 110.

The RNC 130 manages radio resources of the Node B 120, controls a position determinating process of the UE, and calculates the UE's position. In this case, an 'Iub' interface is adapted between the RNC 130 and the Node B 120.

The SMLC 140 calculates and stores either TDOA auxiliary information or GPS auxiliary information associated with a specific cell, and transmits the GPS auxiliary information to the RNC 130 over an 'Iupc' interface.

The CN 150 manages information of one or more UEs 110, and performs a mobility management function, a session management function, and a call management function.

The LSC client 160 is connected to an external part of the network, and provides a service associated with the UEs' position information. The LSC client 160 requests UE position information from the CN 150, and transmits a position service to a corresponding UE using position information received from the CN 150. An 'Iu' interface is set up between CN 150 and RNC 130, while an 'Le' interface is set up between CN 150 and LSC client 160.

The GPS auxiliary information stored/managed in the SMLC 140 includes, among other things, satellite IDs, Almanac data, satellite orbital information, clock error correction values, ionospheric layer correction values, DGPS (Differential GPS) correction values of individual satellites, and list information of invisible satellites. The Almanac data is indicative of UE position information (e.g., model information) for every time interval in association with a predetermined time for detecting approximate UE position information. Specifically, the Almanac data has been adapted to discriminate visible satellites. The satellite orbital information and the clock error correction values are indicative of information for transmitting correct model information of a satellite location to the UE. The ionospheric layer correction values are adapted to correct an ionospheric layer delay error encountered during a propagation time in an ionospheric layer contained in a pseudo range between the satellite and the UE by about 50%, and is slowly changed as compared to other information. The DGPS correction values control deviation errors contained in a pseudo range using a reference Node B, and removes the deviation error, such that it can improve position accuracy of the UE. The Almanac data, the satellite orbital information, the clock error correction value, and the DGPS correction value must be determined for every satellite.

The RNC 130 receives the GPS auxiliary information associated with a maximum of 12 satellites calculated by a reference GPS receiver positioned in the network from the UE 110 over the Node B 120 for managing a cell including the UE 110, such that it can calculate the UE's position. In this case, the GPS auxiliary information transmitted to the UE 110 has great magnitude.

In more detail, satellite orbital information and clock error information for every satellite requires 72 bytes, and the DGPS correction value requires data of 6 bytes. The Almanac data is acquired from 4 and 5 sub-frames of a GPS navigation message, and requires a single sub-frame for each satellite, such that the Almanac data and satellite health information are transmitted with all the satellite information, and 3 sub-frames are needed for satellite health and ionospheric layer error model information. Therefore, information denoted by "the number of satellites * 80 bytes" is required for transmission of all the information, and data of 15 bytes is required for other information. In conclusion, information equal to the length of (n*(72+6)+n*80+15) bytes must be transmitted to the UE to transmit GPS auxiliary information for calculating navigation data of N (or "n") satellites to the UE. In this case, the minimum number of GPS satellites for determining a three-dimensional position is 4. Therefore, a minimum size required for transmission of GPS auxiliary information is denoted by 651(=(4*(72+6)+4*80+15)) bytes.

In order to satisfy the aforementioned requirements, the conventional system must sufficiently guarantee dedicated downlink data speeds for every UE to transmit the GPS auxiliary information to the UE.

If the UE requests position information from the network (e.g., a mobile communication network) to use a position-based service, a call bearer setup process for allocating a dedicated channel to the UE must be performed, such that an initialization time for determining the UE's position increases, and dedicated channels must be allocated to individual UEs requesting position information. Therefore, the amount of capacity and data traffic are linearly increased in proportion to the number of UEs.

SUMMARY OF THE INVENTION

It is an object of the present invention to provide an apparatus and method for determining position information of a UE so that it effectively prevents the amount of capacity and data traffic from being increased, in which the capacity and the data traffic are generated when dedicated channels are allocated to individual UEs each generating a position determination request.

It is another object of the present invention to provide an apparatus and method for determining position information of a UE so that it can reduce the magnitude of GPS auxiliary information transmitted to the UE generating a position determination request.

In accordance with one aspect of the present invention, the above and other objects can be accomplished by providing an apparatus for determining position information of one or more UEs (User Equipments), the apparatus including a plurality of Node Bs for transmitting propagation signals to UEs positioned in a specific cell, and generating predetermined data for measuring position information of the UEs on the basis of propagation signals received from the UEs; a GPS (Global Positioning System) auxiliary information manager for generating and storing GPS auxiliary information associated with a specific cell using a GPS satellite signal received via a built-in GPS receiver; and an RNC (Radio Network Controller) connected to the plurality of Node Bs, for receiving GPS auxiliary information from the GPS auxiliary information manager in response to a request signal of at least one Node B from among the plurality of Node Bs, optimizing the received GPS auxiliary information for every Node B, selecting the optimized GPS auxiliary information, and periodically transmitting the selected GPS auxiliary information to the UEs using a multicast method, such as MBMS (multimedia broadcast and multicast service), in which the Node Bs broadcast the GPS auxiliary information received from the RNC to the UEs positioned in a corresponding cell over a broadcast channel.

In accordance with another aspect of the present invention, there is provided a method for determining position information of a UE (User Equipment), the steps of transmitting, by a UE whose position is to be determined, a signal requesting GPS (Global Positioning System) auxiliary information to a Radio Network Controller (RNC), which controls a communication network in which the UE is positioned, using a Node B managing the UE; in response to the request signal, transmitting, by the RNC, a request signal for updating GPS auxiliary information to a GPS auxiliary information manager storing/managing the GPS auxiliary information, and at the same time transmitting a signal for periodically requesting the updated GPS auxiliary information to the GPS auxiliary information manager; in response to the update and request signals, receiving, by the GPS auxiliary information manager, GPS satellite signals receivable via a built-in GPS receiver, and generating GPS auxiliary information associated with satellites corresponding to the received GPS satellite signals; selecting optimum GPS auxiliary information for every Node B connected to the RNC, and periodically transmitting the selected optimum GPS auxiliary information to a corresponding Node B; broadcasting, by the Node Bs, the GPS auxiliary information to UEs positioned in a corresponding cell over a broadcast channel; and determining, by the UEs having received the GPS auxiliary information, position information of a corresponding UE using the received GPS auxiliary information.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Embodiments of the present invention will be described in detail with reference to the accompanying drawings. In the drawings, the same or similar elements are denoted by the same reference numerals. A detailed description of known functions and configurations incorporated herein will be omitted for conciseness.

Figure 2:
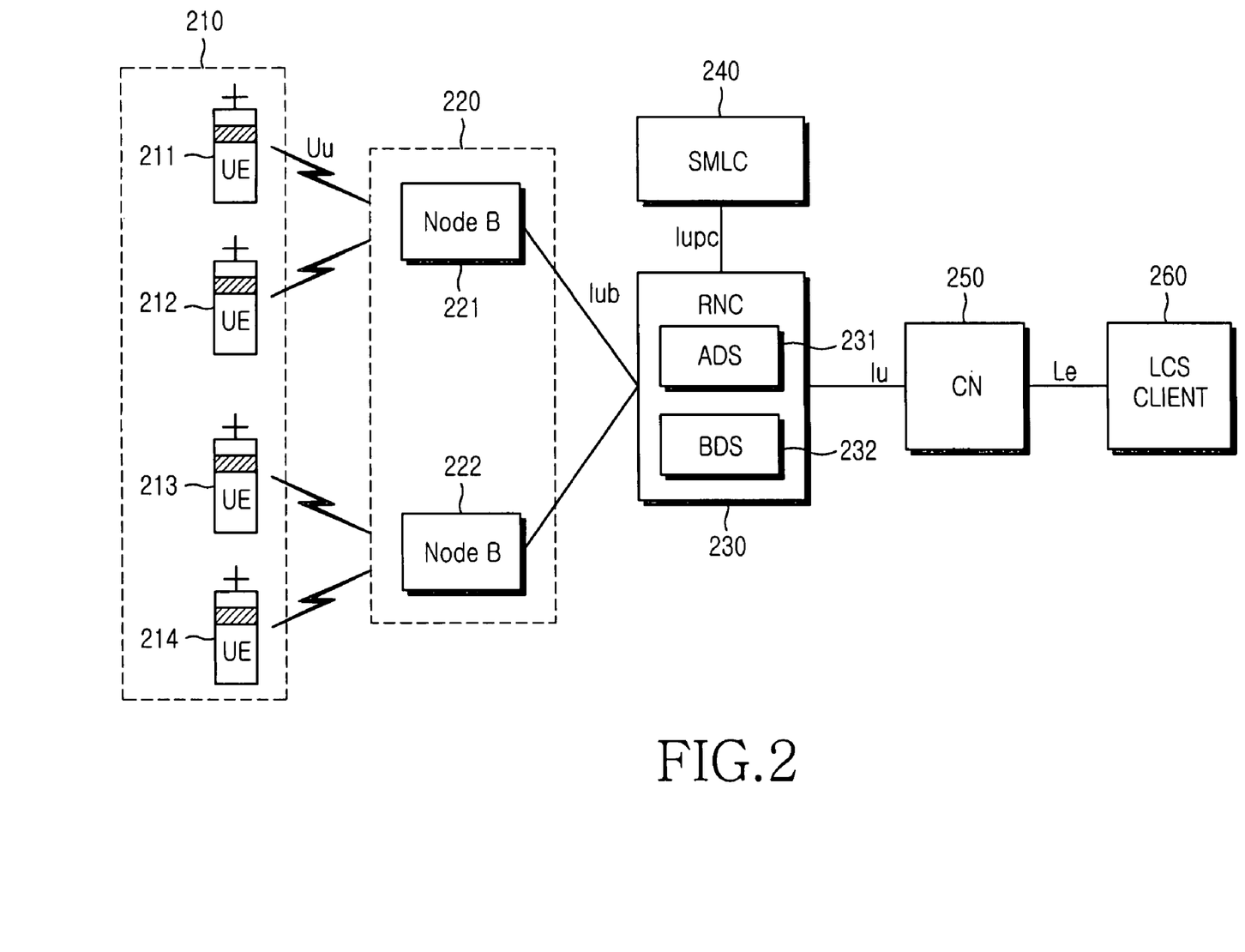
FIG. 2 is a block diagram illustrating an apparatus for determining position information of a UE in accordance with an embodiment of the present invention.

FIG. 2 is a block diagram illustrating an apparatus for determining position information of a UE in accordance with an embodiment of the present invention. Referring to FIG. 2, the UE position determinating device includes a plurality of UEs 210, a plurality of Node Bs 220 for classifying/managing the UEs 210 according to position information of the UEs 210, an RNC (Radio Network Controller) 230, an SMLC (Serving Mobile Location Center) 240, a CN (Core Network) 250, and an LSC (Location Service Client) 260.

The Node Bs 220 transmit propagation signals to the UEs positioned in a specific cell managed by individual Node Bs 220, measure the propagation signals received from the UEs, and transmit predetermined data (e.g., a TDOA, etc.) adapted to determine the UEs' positions to the RNC 230. In this case, the 'Uu' interface is positioned between the Node Bs 220 and the UEs 210. For example, if the UEs 211 and 212 are positioned in a cell managed by the Node B 221 and the other UEs 213 and 214 are positioned in a cell managed by the Node B 222, the Node B 221 establishes data communication with the UEs 211 and 212, and transmits predetermined data adapted to determine position information of the UEs 211 and 212 to the RNC 230. The Node B 222 establishes data communication with the UEs 213 and 214, and transmits predetermined data adapted to determine position information of the UEs 213 and 214 to the RNC 230.

The RNC 230 manages radio resources of the Node Bs 220, and controls a process for determining position information of the UEs 210. In this case, the 'Iub' interface is used by the RNC 230 and the Node Bs 220. More specifically, the RNC 230 receives GPS auxiliary information from the SMLC 240, and transmits the received GPS auxiliary information to the Node Bs 220. The RNC 230 does not transmit all the GPS auxiliary information to individual Node Bs 220, but rather selectively transmits optimum GPS auxiliary information to individual Node Bs 220. The RNC 230 transmits GPS auxiliary information using a broadcast channel at predetermined time intervals. The RNC 230 includes an ADS (Adaptive Data Selector) 231 and a BDS (Broadcast Data Scheduler) 232.

The ADS 231 selects information to be transmitted to individual Node Bs from among the GPS auxiliary information transferred from the SMLC 240. As can be seen from FIG. 2, information to be transmitted to the Node B 221 and the other information to be transmitted to the Node B 222 are selected from overall GPS auxiliary information. In this case, the ADS 231 selects satellite information to be transmitted to individual Node Bs 221 and 222 on the basis of previous position information of the corresponding Node Bs 221 and 222.

The BDS 232 determines broadcast scheduling information for periodically broadcasting GPS auxiliary information selected for every Node B to a corresponding Node B by means of the ADS 231, and periodically broadcasts the GPS auxiliary information selected for every Node B to a corresponding Node B using the broadcast scheduling information.

The SMLC 240 calculates/stores the predetermined data, such the TDOA auxiliary information, or GPS auxiliary information associated with a specific cell using a built-in GPS receiver, and transmits the GPS auxiliary information to the RNC 230 over the 'Iupc' interface.

The CN 250 manages information of the UEs 210, and performs a mobility management function, a session management function, and a call management function. The CN 250 communicates with RNC 230 over the 'Iu' interface.

The LSC client 260 is connected to an external part of the network, and provides a service associated with the UEs' position information. The LSC client 260 requests UE position information from the CN 150, and provides a position service to a corresponding UE using position information received from the CN 250. The LSC client 260 and the CN 250 communicate over the 'Le' interface.

The UEs 210 having AGPS (Assisted GPS) functions determine their positions using GPS auxiliary information broadcast from a corresponding Node B 221 or 222, and can use the position service provided by the LSC client 260 according to the determination result.

Figure 3:
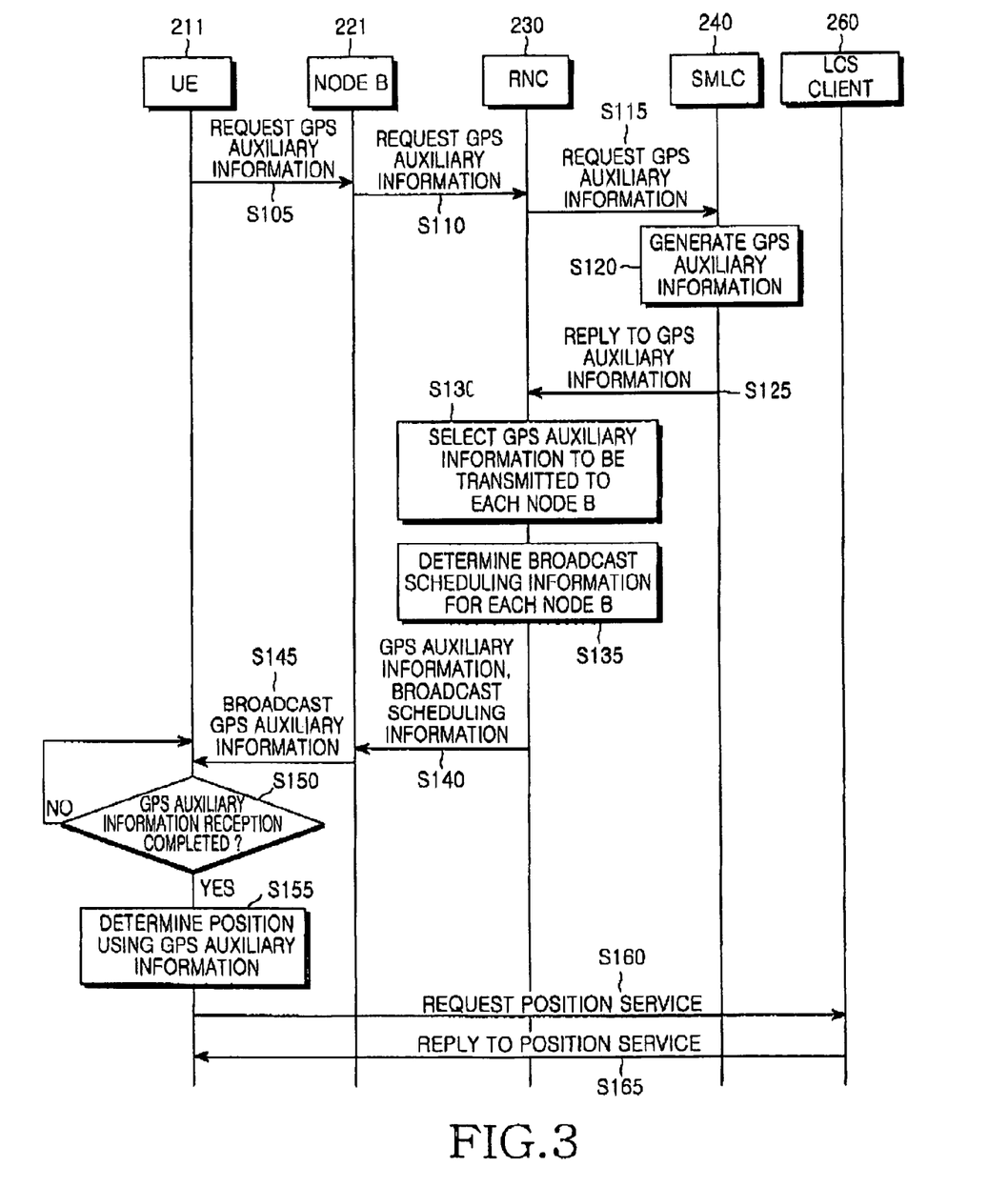
FIG. 3 is a flow chart illustrating a method for determining position information of the UE in accordance with an embodiment of the present invention.

FIG. 3 is a flow chart illustrating a method for determining position information of the UE in accordance with an embodiment of the present invention. It should be noted that the following description will be described on the basis of an exemplary UE 211 whose position is to be determined. Following a request by UE 211 for GPS auxiliary information at step S105, and a request by Node B 221 for the same at step S110, the RNC 230 generates different GPS auxiliary information in association with individual Node Bs. The RNC 230 commands the SMLC 240 storing/managing GPS auxiliary information to update GPS auxiliary information, and periodically requests the GPS auxiliary information from the SMLC 240 at step S115.

Upon receiving the output signals for updating and periodically requesting the GPS auxiliary information from the RNC 230, the SMLC 240 receives a GPS satellite signal using its GPS receiver, and generates GPS auxiliary information of individual satellites using navigation frame information included in the received GPS satellite signal at step S120. In more detail, the SMLC 240 acquires IDs, Almanac data, satellite orbital information, clock error correction values, and ionospheric layer correction values from individual satellites, and calculates a DGPS (Differential GPS) correction value. In this case, the magnitude of the GPS auxiliary information is the same as in the aforementioned description. For example, the magnitude of the GPS auxiliary information in association with 12 satellites is denoted by the following Equation 1:

$$\text{Magnitude of GPS auxiliary information} = 12*(72+6)+12*80+15 \quad (1)$$
$$= 1{,}911 \text{ bytes}$$

The SMLC 240 generates the GPS auxiliary information, and transmits at steps 125 the GPS auxiliary information to the RNC 230 as a response signal to the request signal that was generated by the RNC 230 at step S115. The request signal is adapted to request the GPS auxiliary information.

Figure 4:
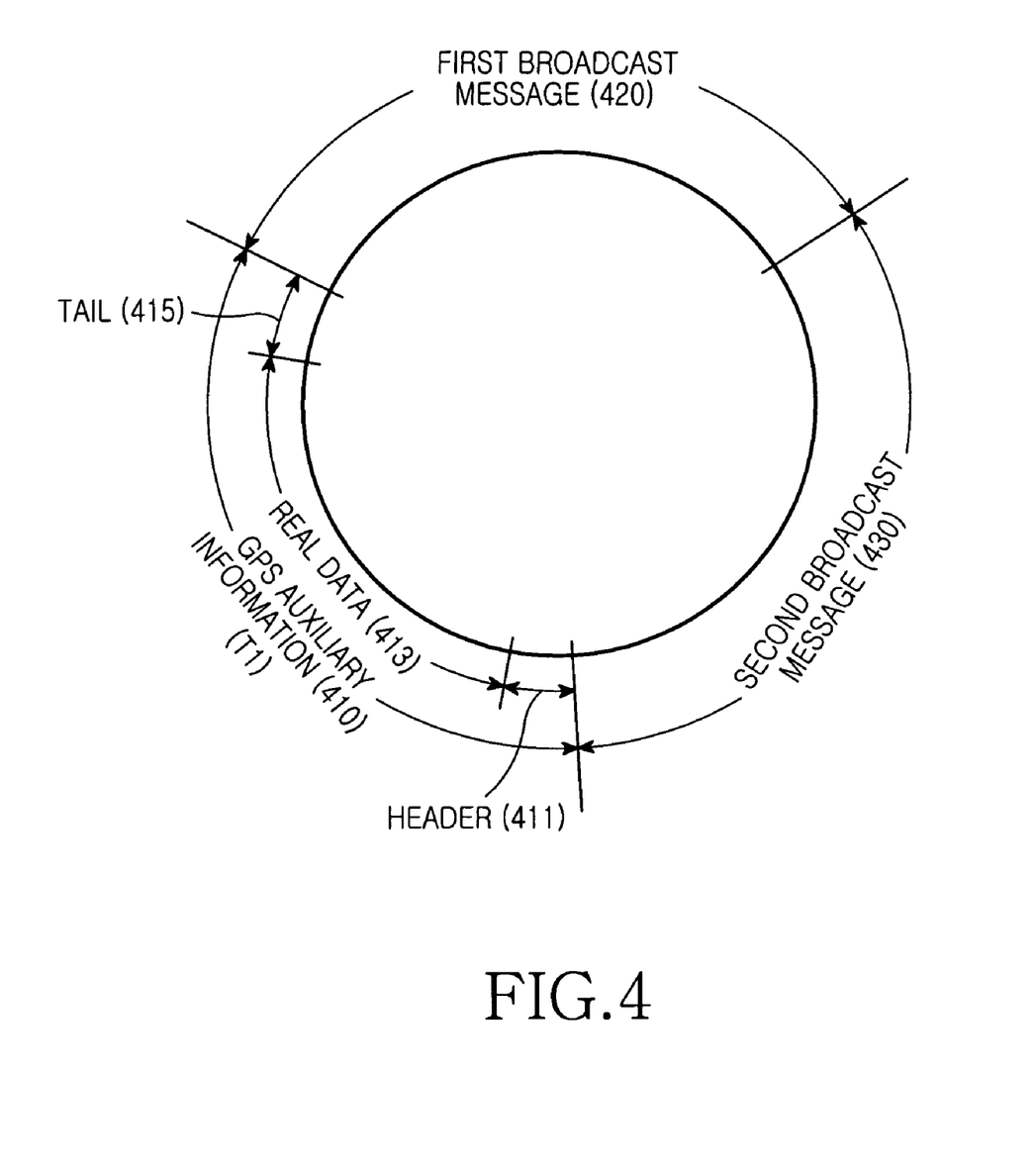
FIG. 4 is a conceptual diagram illustrating a time period for transmitting GPS auxiliary information in accordance with an embodiment of the present invention.

The RNC 230 transmits GPS auxiliary information received from the SMLC 240 to the Node B 221. In this case, a plurality of Node Bs are connected to the RNC 230. Therefore, the RNC 230 may transmit the same GPS auxiliary information to all the Node Bs, or may selectively transmit different GPS auxiliary information for every Node B on the basis of position information of Node Bs. FIG. 4 exemplarily shows the latter case in which the RNC 230 selectively transmits different GPS auxiliary information for every Node B on the basis of position information of Node Bs. The example of FIG. 4 describes a method for transmitting only a subset of the GPS auxiliary information to individual Node Bs, and transmitting the subset of the GPS auxiliary information to a UE, resulting in increased radio traffic efficiency.

Upon receiving the GPS auxiliary information from the SMLC 240, the RNC 230 selects GPS auxiliary information to be transmitted to individual Node Bs on the basis of position information of the plurality of Node Bs connected to the RNC 230 at step S130. For example, the RNC 230 selects satellite information on the basis of an elevation angle and a DOP (Dilution of Precision) contained in the GPS auxiliary information. In more detail, the RNC 230 compares the elevation angle and the DOP contained in the GPS auxiliary information with position information of individual Node Bs, so that it can select optimum GPS auxiliary information to be transmitted to a corresponding Node B. In this case, if the RNC 230 receives the GPS auxiliary information associated with 12 satellites at step S125, it performs the process of the above step S130, and determines that only GPS auxiliary information associated with 8 satellites is to be transmitted to the Node B 221, the magnitude of the GPS auxiliary information is denoted by the following Equation 2:

$$\text{Magnitude of GPS auxiliary information} = 8*(72+6)+8*80+15 \quad (2)$$
$$= 1{,}279 \text{ bytes}$$

Therefore, in the case of comparing the result '1,279 bytes' of Equation 2 with the result '1,911 bytes' of Equation 1 for transmission of all the GPS auxiliary information of 12 satellites, it can be recognized that the transmission efficiency of Equation 2 is higher than that of Equation 1 by about 33%.

After selecting the GPS auxiliary information to be transmitted to individual Node Bs, the RNC 230 determines broadcast scheduling information for each Node B at step S135, and transmits the selected GPS auxiliary information and the determined broadcast scheduling information to the Node B 221 at step S140. In this case, a variety of broadcast scheduling information is determined at step S135, for example, a data re-transmission period, a data length, and a data update period.

Thereafter, the Node B 221 broadcasts corresponding GPS auxiliary information over a predetermined broadcast channel on the basis of the received broadcast scheduling information at step S145. UEs contained in an area managed by the Node B 221 calculate their position information using the GPS auxiliary information.

Therefore, if the GPS auxiliary information received at step S145 has been completely received at step S150, the UE 211 determines its position using the received GPS auxiliary information at step S155. A method for controlling the UE 211 to determine its position using the received GPS auxiliary information can be implemented using a variety of techniques well known in the art. For example, the UE 211 measures a GPS signal using the received GPS auxiliary information, and measures a satellite position and a pseudo range between the satellite and the UE according to the measured result of the GPS signal. The measured satellite position and the measured pseudo range between the satellite and the UE are triangulated in such a way that the UE's position is determined.

The UE 211 whose position information has been determined as described above requests a position service from the LSC client 260 using the determined position information at step S160, receives a response signal to the position service request from the LSC client 260, and uses the received response signal at step S165.

FIG. 4 is a conceptual diagram illustrating a time period for transmitting GPS auxiliary information in accordance with an embodiment of the present invention. In FIG. 4, a first period during which data is transmitted to UEs positioned in an area managed by a Node B is denoted by a circle, and a second time period during which data is transmitted to corresponding UEs within the first period is shown in FIG. 4. Referring to FIG. 4, a corresponding Node B transmits GPS auxiliary information 410, and first and second broadcast messages 420 and 430 for different application services during the first period indicative of one period for data transmission. In this case, the GPS auxiliary information 410 transmitted to the UEs includes a header 411 indicative of the beginning of data, real data 413, and a tail 415 indicative of the end of data, so that it can be distinguished from other broadcast messages.

As apparent from the above description, an apparatus and method for determining position information of one or more UEs according to the present invention transmits GPS auxiliary information, needed to determine the position information of the UEs, to the UEs using a multicast scheme, and allocates public broadcast channels to individual cells in which the UEs, whose positions are to be determined, are positioned, so that it can prevent the amount of capacity and data traffic from being increased. Furthermore, the present invention selects some parts of GPS auxiliary information optimized for every Node B, and transmits the selected GPS auxiliary information, resulting in reduction of the magnitude of the GPS auxiliary information and increased transmission efficiency. As a result, the UEs can more quickly determine their positions.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for determining position information of one or more UEs (User Equipments), comprising:
   a plurality of UEs for requesting GPS (Global Positioning System) auxiliary information to a Node B of a specific cell where the UE is positioned;
   a plurality of Node Bs for requesting the GPS auxiliary information to a Radio Network Controller (RNC) in response to the GPS auxiliary information request from UEs positioned in a specific cell;
   a GPS (Global Positioning System) auxiliary information manager for generating and storing GPS auxiliary information associated with a specific cell using a GPS satellite signal received via a built-in GPS receiver; and
   an RNC (Radio Network Controller) connected to the plurality of Node Bs, for receiving GPS auxiliary information from the GPS auxiliary information manager in response to a request signal of at least one Node B from among the plurality of Node Bs, optimizing the received GPS auxiliary information for every Node B, selecting the optimized GPS auxiliary information, and periodically transmitting the selected optimized GPS auxiliary information, in which
   the Node Bs broadcast the optimized GPS auxiliary information received from the RNC to the UEs positioned in the specific cell over a broadcast channel.

2. The apparatus according to claim 1, wherein the GPS auxiliary information manager acquires at least one of satellite IDs (Identifiers), Almanac data, satellite orbital information, clock error correction values, and ionospheric layer correction values from individual satellites corresponding to a plurality of GPS satellite signals receivable via the GPS receiver, and calculates a DGPS (Differential GPS) correction value.

3. The apparatus according to claim 1, wherein the RNC includes:
   an Adaptive Data Selector (ADS) for receiving the GPS auxiliary information associated with a plurality of satellites from the GPS auxiliary information manager, and for selecting specific GPS auxiliary information to be transmitted to each of the Node Bs from among the received GPS auxiliary information; and
   a Broadcast Data Scheduler (BDS) for determining broadcast scheduling information, adapted to periodically broadcast the selected GPS auxiliary information selected for each Node B to a corresponding Node B, and for broadcasting the GPS auxiliary information selected for each Node B to a corresponding Node B according to the determined broadcast scheduling information.

4. The apparatus according to claim 3, wherein the ADS compares an elevation angle and a DOP (Dilution Of Precision) contained in the GPS auxiliary information with position information of the Node Bs, and thereby selects GPS auxiliary information to be transmitted to individual Node Bs.

5. The apparatus according to claim 3, wherein the broadcast scheduling information determined by the BDS includes at least one of a data re-transmission period, a data length, and a data update period.

6. The apparatus according to claim 3, wherein the BDS further includes header information indicative of the beginning of the GPS auxiliary information within a period for transmitting the GPS auxiliary information and tail information indicative of the end of the GPS auxiliary information within the same period in the GPS auxiliary information.

7. A method for determining position information of a UE (User Equipment), comprising the steps of:
   a) transmitting, by a UE whose position is to be determined, a signal requesting GPS (Global Positioning System) auxiliary information to a Radio Network Controller (RNC), which controls a communication network in which the UE is positioned, using a Node B managing the UE;
   b) transmitting, by the RNC, a request signal for updating GPS auxiliary information to a GPS auxiliary information manager storing/managing the GPS auxiliary information, and at the same time transmitting a signal for periodically requesting the updated GPS auxiliary information to the GPS auxiliary information manager, in response to the request signal of step (a);
   c) receiving, by the GPS auxiliary information manager, GPS satellite signals receivable via a built-in GPS receiver, and generating GPS auxiliary information associated with satellites corresponding to the received GPS satellite signals, in response to the request signals of step (b);
   d) selecting optimum GPS auxiliary information for every Node B connected to the RNC, and periodically transmitting the selected optimum GPS auxiliary information to a corresponding Node B;
   e) broadcasting, by the Node Bs, the GPS auxiliary information to UEs positioned in a corresponding cell over a broadcast channel; and
   f) determining, by the UEs having received the GPS auxiliary information, position information of a corresponding UE using the received GPS auxiliary information.

8. The method according to claim 7, wherein the GPS auxiliary information generated at step (c) includes at least one of satellite IDs, Almanac data, satellite orbital information, clock error correction values, and ionospheric layer correction values, which are acquired from GPS satellite signals receivable in the GPS auxiliary information manager, and a DGPS (Differential GPS) correction value calculated by the GPS auxiliary information manager.

9. The method according to claim 7, wherein step (d) includes the steps of:
   d1) selecting GPS auxiliary information to be transmitted to the plurality of Node Bs from among the GPS auxiliary information generated at step (c);
   d2) determining broadcast scheduling information, adapted to periodically broadcast the selected GPS auxiliary information to a corresponding Node B; and
   d3) broadcasting the GPS auxiliary information selected for every Node B to a corresponding Node B according to the determined broadcast scheduling information.

10. The method according to claim 9, wherein step (d1) includes the step of:
   d1-1) comparing an elevation angle and a DOP (Dilution Of Precision) contained in the GPS auxiliary information with position information of the Node Bs, thereby selecting GPS auxiliary information to be transmitted to individual Node Bs.

11. The method according to claim 9, wherein the broadcast scheduling information determined at step (d2) includes at least one of a data re-transmission period, a data length, and a data update period.

12. The method according to claim 9, wherein step (d3) includes the step of:
   d3-1) including header information indicative of the beginning of the GPS auxiliary information within a period for transmitting the GPS auxiliary information and tail information indicative of the end of the GPS auxiliary information within the same period in the GPS auxiliary information.

* * * * *